No. 725,138. PATENTED APR. 14, 1903.
H. M. QUICK.
ENGINE PISTON.
APPLICATION FILED MAY 11, 1901.
NO MODEL.
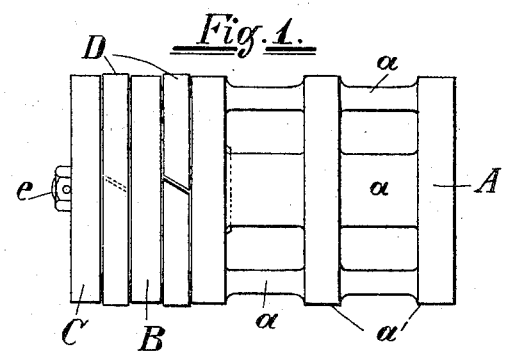
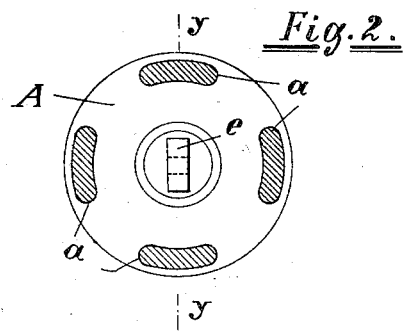
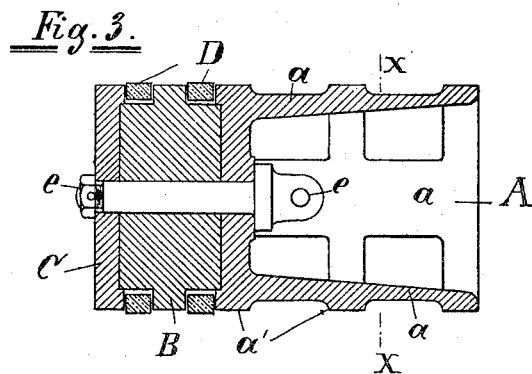
WITNESSES:
Stella A. Hughes.
C. A. Cadmus
INVENTOR.
Hiram M. Quick,
BY John F. Kerr
ATTORNEY.
THE NORRIS PETERS CO., PHOTO-LITHO., WASHINGTON, D. C.

United States Patent Office.

HIRAM M. QUICK, OF PATERSON, NEW JERSEY, ASSIGNOR OF ONE-HALF TO HENRY B. KING, OF PATERSON, NEW JERSEY.

ENGINE-PISTON.

SPECIFICATION forming part of Letters Patent No. 725,138, dated April 14, 1903.

Application filed May 11, 1901. Serial No. 59,771. (No model.)

*To all whom it may concern:*

Be it known that I, HIRAM M. QUICK, a citizen of the United States, residing at Paterson, in the county of Passaic and State of New Jersey, have invented certain new and useful Improvements in Engine-Pistons, of which the following is a specification, reference being had therein to the accompanying drawings.

My invention relates to pistons for engines, and although especially designed for use in my gasolene-engines it may be employed in engines of other types.

The principal object of my invention is to provide a piston which will increase the power and durability of an engine by reducing the friction-surface of the piston where it comes in contact with the inner walls of the cylinder. This is accomplished by the novel and peculiar construction and arrangement and the combination of the parts of my antifriction-piston, which will be hereinafter described and is shown in the accompanying drawings.

In the different figures of the drawings similar letters of reference indicate like parts.

Figure 1 is a side view of my piston. Fig. 2 is a cross-sectional view thereof on the line $x\ x$ in Fig. 3, and Fig. 3 is a longitudinal sectional view of the same on the line $y\ y$ in Fig. 2.

In the drawings, A represents the body of the piston, which is provided with the friction or guiding surfaces $a'$, the arms or ribs $a$ connecting said friction or guiding surfaces $a'$, but not being flush with said guiding-surfaces, the packing-ring holder B, the washer or end portion C, and the annular recess or seat for the packing-rings D. The bolt $e$ serves to hold the parts A, B, and C together and to connect the piston to the connecting-rod of the engine. As shown in Fig. 3, the thickness of the wall of the piston, both of the friction portions $a'$ and the ribs $a$, increases toward the end of the piston, thus affording the lightness and diminishing the friction of the piston on the inner walls of the cylinder, reducing it to a minimum without sacrificing the element of strength. This reduction of the friction enhances the power and prolongs the life of the engine, besides giving a high piston speed.

I do not wish to limit myself to any particular shape or the piston's friction or guiding surfaces, as the essential element or principle of my piston, which consists in reducing to a minimum the surface portion which comes into contact with the inner surface of the cylinder when in operation, may be applied to any piston, no matter what its shape, square, oval, or round. In all cases the conformation of the interior of the cylinder will determine the shape of the piston's guiding or friction surfaces without departing from within the scope of my invention.

With this description of my invention, what I claim as new, and desire to secure by Letters Patent, is—

1. In a piston, the perforated integral cup-shaped portion A, the walls of which grow thicker toward the bottom, annular friction-surfaces $a'$, depressed longitudinally-extending ribs $a$ connecting said annular friction-surfaces, the packing-ring holder B having annular seats, the packing-rings D adapted to rest in said seats, the end portion C, and the bolt $e$ securing the parts A B and C together, and serving to connect the piston to the connecting-rod of the engine, substantially as set forth.

2. In a piston, the combination of a perforated cup-shaped portion A, the packing-ring holder B, and the end portion C, all constructed as shown and described, with the packing-rings D, and the bolt $e$, adapted to secure the parts A B and C together, substantially as set forth.

In testimony whereof I affix my signature in presence of two witnesses.

HIRAM M. QUICK.

Witnesses:
 JOHN F. KERR,
 BESSIE STEWART.